United States Patent [19]

Urban

[11] 3,919,055

[45] Nov. 11, 1975

[54] BUBBLE DOMAIN DETECTOR CONTACT

[75] Inventor: Michael J. Urban, Framingham, Mass.

[73] Assignee: GTE Laboratories, Waltham, Mass.

[22] Filed: Nov. 4, 1974

[21] Appl. No.: 520,582

[52] U.S. Cl. .......... 204/38 B; 117/234; 204/15; 204/192; 340/174 EB

[51] Int. Cl.$^2$ .......... C25D 5/00; G11C 11/02

[58] Field of Search .......... 204/15, 38 B, 192; 340/174 EB

[56] References Cited

UNITED STATES PATENTS

| | | | |
|---|---|---|---|
| 3,634,159 | 1/1972 | Croskery | 204/15 X |
| 3,653,946 | 4/1972 | Fefferman | 204/38 B X |
| 3,653,999 | 4/1972 | Fuller | 204/15 X |
| 3,666,635 | 5/1972 | Oshima et al. | 204/38 B X |
| 3,729,406 | 4/1973 | Osborne et al. | 204/192 |
| 3,737,380 | 6/1973 | Bachmeier | 204/15 |
| 3,825,885 | 7/1974 | Hendez et al. | 340/174 EB X |
| 3,856,647 | 12/1974 | Blachman | 204/192 |

FOREIGN PATENTS OR APPLICATIONS

| | | | |
|---|---|---|---|
| 866,755 | 3/1971 | Canada | 204/38 B |

*Primary Examiner*—John H. Mack
*Assistant Examiner*—Aaron Weisstuch
*Attorney, Agent, or Firm*—Irving M. Kriegsman; Leslie J. Hart

[57] ABSTRACT

Electrical contact with the ends of a magnetoresistive strip in a bubble domain detector is formed by sputtering a first layer of a conductive material and then electroplating over the first layer a thicker second layer of the same conductive material. The necessary thickness of the conductive material is obtained without the undesirable effects achieved in the magnetoresistive strip when the entire thickness is provided solely by sputtering techniques.

4 Claims, 3 Drawing Figures

BUBBLE DOMAIN DETECTOR CONTACT

BACKGROUND OF THE INVENTION

The present invention relates to the art of bubble memory devices and more specifically to magnetoresistive detectors for such devices.

Recently, significant development has been directed to bubble memory devices and especially to various types of bubble detectors. As is well known, the detector is disposed in a propagation track and generates a recognizable output whenever a magnetic bubble passes through the vicinity of the detector. One of the known types of magnetoresistive detectors is the chinese character detector. In such a detector, a magnetoresistive strip is placed adjacent to a propagation track and the strip is connected to a source of electrical power. As a bubble passes by the strip, the resistance of the strip changes slightly; these changes are observed by a change in the voltage drop through the material.

The variation in resistance due to the magnetic field of a bubble is quite small. To enhance the effect of the variation it is frequently desirable to keep the thickness of the magnetoresistive strip as small as possible. In a typical chinese character detector, the thickness of a permalloy film which constitutes the strip may be about 400Å. while the thickness of the permalloy propagation track may be approximately 4000Å.

One of the important factors in the design of detectors resides in the techniques for making an electrical connection with the magnetoresistive strip. In one known detector, the conductive layer, such as gold, is deposited on a substrate, such as by known sputtering techniques. The gold layer may have a thickness in the order of 5000Å. to ensure a low resistance path form the power source to the magnetoresistive strip. Then, the magnetoresistive strip such as permalloy, is deposited on the substrate and on the edges of the film of conductive material. The permalloy may be a thin layer of approximately 400Å. thickness because in the chinese character detector the nominal resistance should be as high as possible so that the variation in resistance, which is based on a nominal percentage of about 2%, is as large as possible. This arrangement was found to have problems of burn-out. Since the permalloy was sputtered, the thickness of the permalloy in the region of its contact with the sloping surface of the conductive film is even smaller than the average permalloy thickness.

Another attempt to devise a suitable contact involves depositing the magnetoresistive strip first and then depositing the conductive material over the edges of the strip. This arrangement overcomes the problems of burn-out, but it also introduces another undesirable feature. If the conductive film is deposited by sputtering, the sputtering of 10 times as much thickness of gold on the permalloy as the thickness of the permalloy had an adverse effect on the magnetoresistance of the permalloy. While the reasons for this are not entirely clear, it does appear that the sputtering process does degrade the magnetoresistive properties as a function of time.

SUMMARY OF THE INVENTION

It is an object of the present invention to provide a method of producing a detector contact which is not susceptible to contact burn-out.

It is another object to provide a method of forming a detector contact in which the conductive layer is disposed over the ends of the magnetoresistive strip but in which the deposition of the conductive layer does not adversely effect the properties of the magnetoresistive strip.

According to the present invention, there is described a method of producing an electrical contact with a magnetoresistive strip in a bubble memory device and the device formed according to the method. In the method, a pattern of magnetic film is deposited on a planar surface of a substrate. This pattern includes a propagation track and a bubble stretching section in the track. A magnetoresistive film strip is deposited adjacent to the bubble stretching section; the strip undergoes a detectable change in resistance as a bubble propagates through the bubble stretching section. Then, a thin first layer of a conductive material is sputtered onto the ends of the strip and the substrate to form electrical leads for the strip. Lastly, a second layer of the conductive material is electroplated onto the first layer to provide the necessary thickness for the conductive material. By the foregoing process, burn-out of the magnetoresistive strip is prevented because the thickness of the magnetoresistive strip is uniform throughout, since the strip is deposited only on a planar surface. Secondly, the desired thickness of the conductive material is accomplished primarily by the electroplating step rather than the sputtering step; thus, the magnetoresistive properties of the strip are not adversely effected as is the result when the strip is subjected to prolonged sputtering techniques.

In the preferred embodiment of the invention, the conductive material is gold, the strip is permalloy and the substrate is glass; in addition, before the first gold layer is deposited, a layer of chromium is deposited onto the glass substrate and the ends of the permalloy magnetoresistive strip. The chromium adheres to glass more effectively than does gold. Further, the thickness of the permalloy magnetoresistive strip is about equal to the thickness of the chromium and the first gold layer. Preferably, the second gold layer is between 4 to 20 times greater in thickness than the permalloy magnetoresistive strip. This substrate may be juxtaposed against a second substrate having an epitaxially grown layer of a single crystal magnetic material. The gold layer forms a spacer for the substrates. If the layer becomes thicker than 20 times the permalloy, the increased separation between bubble film and the permalloy propagation track creates problems with coherent bubble propagation. On the other hand, a gold thickness substantially less than 4 times the permalloy strip thickness introduces problems in forming a good, low resistance electrical path connecting the magnetoresistive permalloy strip. Preferably, the magnetoresistive permalloy strip is 400Å. thick; this thickness has been found to be adequately low for producing a detectable variation in the resistance of the strip. These and further objects, advantages and features of the invention will be apparent from the following detailed description of the preferred embodiments taken together with the accompanying drawing.

DESCRIPTION OF THE PREFERRED EMBODIMENT

Figure 1:
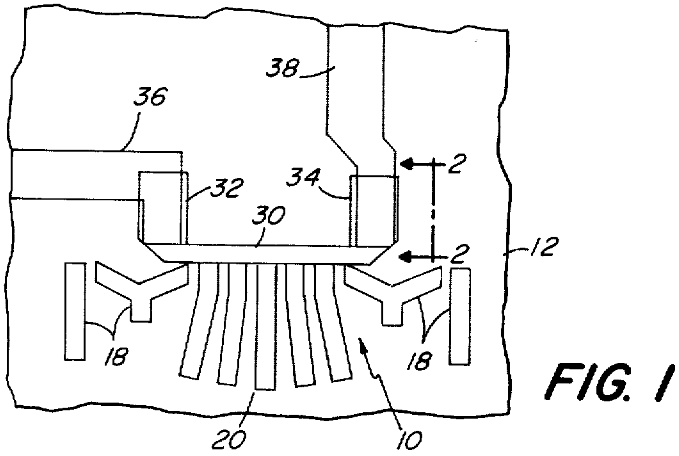
FIG. 1 is a plan view of the preferred embodiment of the present invention.
Figure 2:
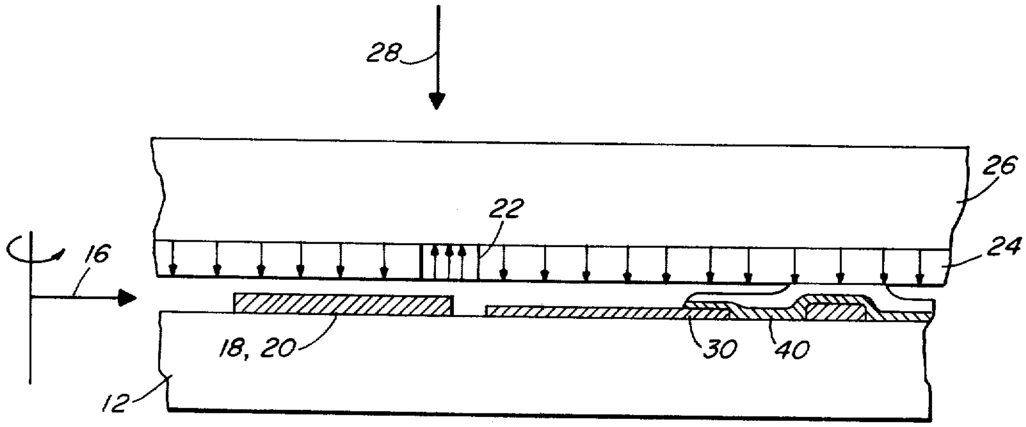
FIG. 2 is an elevational view of the preferred embodiment of the present invention.
Figure 3:
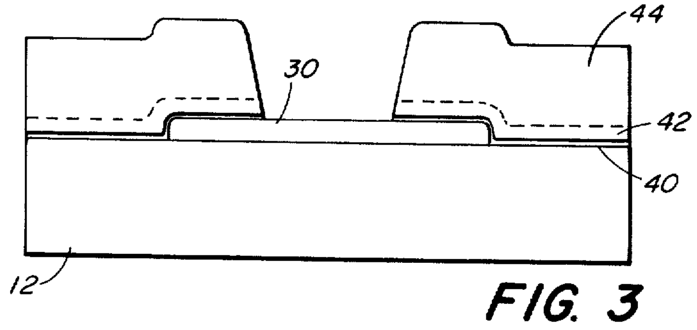
FIG. 3 is a detailed representation of the preferred embodiment of the present invention.

A great deal of development has occured in bubble memory devices and related fabrication techniques. The present invention relates to fabrication techniques for making an electrical contact with an element of a thin film material which is to carry an electrical current. An example of such an application in a bubble memory device is in making electrical contact with a strip of a magnetoresistive material. FIG. 1 shows a pattern 10 of a magnetic film on the planar surface of a non-conductive substrate 12. The pattern includes an arrangement that is effective to produce propagation of a magnetic bubble 22 in FIG. 2 in response to an inplane rotating magnetic field, represented by the reference numeral 16. A typical pattern is a Y-bar arrangement 18. The substrate 12 should be a non-conductive and non-magnetic material, and preferably, the substrate is 7059 glass which is a standard substrate for many types of thin films and thin film components. A bubble stretching section 20 is deposited in the Y-bar pattern 18. Preferably, the section 20 comprises a multifinger, chinese character arrangement as shown in FIG. 1. The bubble represented by the reference numeral 22 is produced in a layer 24, which is deposited on a substrate 26, by the influence of a DC magnetic field 28. Preferably, the substrate 26 is a single crystal, non-magnetic garnet, and the layer 24 is a single crystal epitaxially grown ferromagnetic garnet. The pattern 10 of magnetic film elements is formed by known photoresist and chemical etching techniques. Preferably, the pattern comprises 81 permalloy (81% nickel and 19% iron) and has a thickness of 4000Å over the entire surface of the substrate 12. The permalloy surface is then coated with a photosensitive emulsion, such as a positive working photoresist known as Shipley AZ-1350. A photomask of the desired pattern is prepared and placed over the photoresist. The unmasked portion of the emulsion is then exposed to light. The exposed portion is then removed from the surface of the permalloy. The entire substrate is then immersed in a suitable etching solution, such as 30 parts by volume of $H_2SO_4$, 9 parts $H_2O$ and 1 part $H_2O_2$. The substrate is removed from the etching solution when the permalloy which was originally under the exposed emulsion is removed from the substrate 12. Then the unexposed emulsion is removed, the result being the pattern shown in FIG. 1.

A magnetoresistive film strip 30, such as 81 permalloy, is then deposited on the substrate 12 adjacent to the bubble stretching section 20. The permalloy strip 30 should be substantially thinner than the thickness of the pattern 18 and 20 and preferably is about 400A. It is important in this type of detector, the chinese character detector, to make the nominal resistance of the strip 30 as high as possible. One means for doing this is providing the strip with a small cross-sectional area. Preferably, the film is deposited by triode sputtering over the entire substrate. Photoresist and etching techniques are used to remove the unwanted film; the photomask used here is the same as that used in producing the thick film except that this photomask includes an opaque portion corresponding to the shape of the strip 30.

In the next step in the fabrication process, the conductive material is deposited over the ends 32 and 34 of the strip 30 and on the substrate 12 to form a pair of leads 36 and 38. The preferred conductive material is gold and the preferred substrate is glass; also, it is preferable to first deposit a preliminary layer of a conductive material which readily adheres to glass and upon which gold readily adheres. The reason for this step is that gold does not properly adhere to glass. Preferably, this conductive material comprises a layer 40 of chromium having a thickness of about 400Å. The chromium is preferably deposited by triode sputtering.

Before the chromium is photomasked and etched, a first layer 42 of gold is sputtered over the chromium layer 40. Excessive sputtered gold deposition can affect detector characteristics and is therefore held to a thickness of a few hundred angstroms. Preferably, the thickness is 400Å. The excessive gold and chromium, the entire surface of the substrate except the leads 36 and 38 and the portions over the ends 32 and 34 of the strip 30, are then removed by photoresist and chemical etching techniques. The photomask has opaque portions correspondly to the leads and strip end portions previously mentiond. A typical etchant for the excess gold is 35 gm KI, 10gm $I_2$ and 100 ml $H_2O$; this etchant is opaque and the etching step is done on a strict time basis. A preferred etchant for chromium is 5.3 gm ceric sulfate, 100 ml $H_2O$ and 20 ml $HNO_3$; this etchant is clear so that the substrate may be immersed in the etchant until all the excess chromium is observed to be removed.

In the last step, a second layer 44 of gold is electroplated onto the first layer which was previously deposited by sputtering techniques. However, before electroplating, it is necessary to photoresist again so that the detector strip 30 is not electroplated. The leads from a constant current power supply are attached to the border (not shown) of the gold chromium conductor pattern 36 and 38. A clip is used to connect the leads to the pattern and this clip is insulated every where except where it makes direct contact with the substrate. Only the fixed conductor pattern is electroplated. A typical electroplating solution is 1 troy ounce of Aurall 292 gold salts and ¾ gallon of Aurall 292 make up liquid. The purpose of the electroplating step is to increase the thickness of the gold conductor to reduce the resistance and to provide spacer points for controlling the space between the substrate bearing the permalloy film and the substrate bearing the bubble film. Electroplating has no adverse effect on the magnetoresistive strip. The thickness of the gold conductor after electroplating may be as great as 8000Å. and preferably is 5000Å.

The embodiment of the present invention is intended to be merely exemplary and those skilled in the art shall be able to make numerous variations and modifications of it without departing from the spirit of the present invention. All such variations and modifications are intended to be within the scope of the present invention as defined by the appended claims.

I claim:

1. A method of producing an electricl contact with a magnetoresistive element in a bubble memory detector device including the steps of:

a. depositing a pattern of magnetic film on a planar surface of a non-conductive glass substrate, the pattern being effective to propagate a magnetic bubble along a track in response to an in plane rotating field, the track including a bubble stretching section, b. depositing a megnetoresistive film strip on the substrate and adjacent to the bubble stretching section, c. depositing a layer of chromium effective to adhere to the glass and to form an adhering surface, d. sputtering a first layer of gold over the ends of the magnetoresistive strip and on the substrate to form conductive leads connecting the magnetoresistive strip; and e. electroplating a second layer of gold over the first layer, the combined thickness of the first and second layers being substantially greater than the thickness of the magnetoresistive strip.

2. The method according to claim 1, wherein the thickness of the chromium layer is 400Å, the thickness of the first gold layer is 400Å. and the thickness of the second gold layer is about 4000Å.

3. A method of producing an electrical contact with a magnetoresistive element in a bubble memory detector device including the steps of:

a. depositing a pattern of magnetic film on a planar surface of a non-conductive substrate, the pattern being effective to propagate a magnetic bubble along a track in response to an in plane rotating field, the track including a bubble stretching section, b. depositing a magnetoresistive film strip on the substrate and adjacent to the bubble stretching section, c. sputtering a first layer of a first conductive material over the ends of the magnetoresistive strip and on the substrate to form conductive leads connecting the magnetoresistive strip; and d. electroplating à second layer of the first conductive material over the first layer, the combined thickness of the first and second layers being substantially greater than the thickness of the magnetoresistive strip, the ratio of the thickness between the second layer and the magnetoresistive strip ranging from about 4 to 20.

4. A method of producing an electrical contact with a magnetoresistive element in a bubble memory detector device including the steps of:

a. depositing a pattern of magnetic film on a planar surface of a non-conductive substrate, the pattern being effective to propagate a magnetic bubble along a track in response to an in plane rotating field, the track including a bubble stretching section, b. depositing a magnetoresistive film strip on the substrate and adjacent to the bubble stretching section, c. sputtering a first layer of a first conductive material over the ends of the magnetoresistive strip and on the substrate to form conductive leads connecting the magnetoresistive strip, the ratio of thickness between the first layer and the magnetoresistive layer being about 0.75; and d. electroplating a second layer of the first conductive material over the first layer, the combined thickness of the first and second layers being substantially greater than the thickness of the magnetoresistive strip.

* * * * *